United States Patent
Maddah-Ali et al.

(10) Patent No.: US 9,535,837 B2
(45) Date of Patent: Jan. 3, 2017

(54) DECENTRALIZED ONLINE CACHE MANAGEMENT FOR DIGITAL CONTENT CONVEYED OVER SHARED NETWORK CONNECTIONS BASED ON CACHE FULLNESS AND CACHE EVICTION POLICIES

(71) Applicant: ALCATEL-LUCENT USA INC., Murray Hill, NJ (US)

(72) Inventors: Mohammadali Maddah-Ali, Piscataway, NJ (US); Urs Niesen, Summit, NJ (US); Ramtin Pedarsani, Berkeley, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 524 days.

(21) Appl. No.: 14/083,723

(22) Filed: Nov. 19, 2013

(65) Prior Publication Data

US 2015/0143043 A1    May 21, 2015

(51) Int. Cl.
*G06F 13/00* (2006.01)
*G06F 12/08* (2016.01)
*G06F 12/12* (2016.01)

(52) U.S. Cl.
CPC .......... *G06F 12/0813* (2013.01); *G06F 12/123* (2013.01); *G06F 12/127* (2013.01); *G06F 2212/1016* (2013.01)

(58) Field of Classification Search
CPC ............ G06F 2212/1016; G06F 12/127; G06F 12/123; G06F 12/0813
USPC ........ 709/217, 218, 219, 220, 226; 711/133, 711/134, 121, 120, 135, 144, 145, 146, 130
See application file for complete search history.

(56) References Cited

U.S. PATENT DOCUMENTS

| | | | |
|---|---|---|---|
| 2003/0217230 A1* | 11/2003 | Rodriguez | G06F 12/127 711/136 |
| 2012/0203910 A1* | 8/2012 | Lan | H04L 67/1029 709/226 |
| 2013/0326133 A1* | 12/2013 | Lee | G06F 17/30982 711/108 |
| 2014/0207913 A1* | 7/2014 | Maddah-Ali | H04L 67/06 709/219 |
| 2016/0007057 A1* | 1/2016 | Niesen | H04N 21/23106 725/115 |

OTHER PUBLICATIONS

Maddah-Ali et al., "Fundamental Limits of Caching", arXiv <http://www.arXiv.org/pdf/1209.5807.pdf> ,Submitted on Sep. 26, 2012, 17 pages.

(Continued)

*Primary Examiner* — Hong Kim
(74) *Attorney, Agent, or Firm* — Davidson Sheehan LLP (57) ABSTRACT

A first cache is provided to cache a first portion of a first block of digital content received over a network connection shared between a first user associated with the first cache and at least one second user. The first cache caches the first portion in response to the first user or the second user(s) requesting the first block. The first cache selects the first portion based on a fullness of the first cache, a number of blocks cached in the first cache, or a cache eviction rule associated with the first cache.

15 Claims, 9 Drawing Sheets

(56) References Cited

OTHER PUBLICATIONS

Maddah-Ali et al., "Decentralized Caching Attains Order-Optimal Memory-Rate Tradeoff", arXiv <http://www.arXiv.org/pdf/1301.5848.pdf>, Submitted on Jan. 24, 2013, 18 pages.
Sleator et al., "Amortized Efficiency of List Update and Paging Rules" Association for Computing Machinery: Programming Techniques and Data Structures, vol. 28, No. 2, Feb. 1985, pp. 202-208.
U.S. Appl. No. 13/746,406, titled "System and Method for Managing Distribution of Network Information," filed Jan. 22, 2013.

\* cited by examiner

DECENTRALIZED ONLINE CACHE MANAGEMENT FOR DIGITAL CONTENT CONVEYED OVER SHARED NETWORK CONNECTIONS BASED ON CACHE FULLNESS AND CACHE EVICTION POLICIES

STATEMENT REGARDING FEDERALLY SPONSORED RESEARCH OR DEVELOPMENT

This invention was made with government support under #FA9550-09-1-0317 awarded by the Air Force Office of Scientific Research. The government has certain rights in the invention.

BACKGROUND

Field of the Disclosure

The present disclosure relates generally to communication networks and, more particularly, to distributing digital content in communication networks.

Description of the Related Art

Content providers such as Netflix, Amazon, Hulu, YouTube, and Verizon provide digital content to end-users over existing wired or wireless communication networks. For example, end-users may watch television shows or movies using video-on-demand or streaming services supported by the content providers. These services are very popular and may consume a significant portion of the bandwidth of the communication network during peak usage. For example, Netflix alone has been estimated to use as much as a third of the bandwidth available in the U.S. between 9 PM and midnight. Caching portions of the digital content before it is requested by end-users may reduce the strain on the network. For example, randomly selected portions of different programs may be prefetched into caches associated with different users before the users choose one or more of the different programs for viewing. If the user then selects one of the programs for viewing, only the un-cached portion needs to be transmitted over the network.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The effectiveness of caching can be increased by prefetching different portions of programs (or other digital content) into caches associated with different users that share the same network connection to the content provider. The portions of the programs can be prefetched into the different caches so that the caches hold complementary portions of the programs. For example, if the content provider is providing two programs (A, B) that are each divided into two portions ($A_1$, $A_2$, $B_1$, $B_2$), the cache associated with a first user may hold the portions ($A_1$, $B_1$) and the cache associated with a second user may hold the complementary portions ($A_2$, $B_2$). Then, if the users request different programs, the content provider can transmit linear combinations of the complementary portions cached in different caches over the shared network connection to the users. The users can use their cached portion to invert the linear combination and retrieve the un-cached portion of their requested programs. For example, if the first user requests program A and the second user requests program B, the content provider can transmit a linear combination such as $A_2$ XOR $B_1$ over the shared network connection. The first user can retrieve the portion $A_2$ using the cached portion $B_1$ to invert the linear combination and the second user can retrieve the portion $B_1$ using the cached portion $A_2$ to invert the linear combination. The bandwidth needed to transmit the linear combination is half the bandwidth required to transmit the two portions $A_2$ and $B_1$ separately.

Data is typically prefetched into the caches during periods of low activity in the communication network. Furthermore, the data is selected for prefetching based upon previously known information such as usage patterns for the previous day. Prefetching, as typically implemented, does not allow the contents of the caches to be dynamically changed in response to changes in demand for digital content. Any changes in the contents of the caches are done offline when traffic load is low. For example, data for a movie or television program may not be prefetched into the caches if the content provider is unaware that users will be requesting the movie or television program, if the content provider assumes that the popularity of the movie or television program will be lower than other movies or television programs, or if at the time of prefetching the new content had not been released yet.

Caches associated with end-users that share a network connection to a content provider can be dynamically updated by overhearing and sampling blocks of digital content transmitted over the network connection. As used herein, the term "overhear" indicates that an end-user is able to receive blocks of digital content over the network connection even though the blocks may have been requested by a different end-user. In some embodiments, blocks may be stored in the caches as long as no portion of the block is already in the cache and the cache is not full. If the cache is full when a block of digital content is received over the network connection and the number of blocks stored in the cache is less than a predetermined threshold, portions of previously stored blocks may be evicted according to a cache eviction rule. For example, randomly selected portions of the previously stored blocks may be evicted from the caches and a corresponding randomly selected portion of the newly received block may be stored in the caches. Thus, the cache space allocated to each block may be reduced (or shrunk) in order to open up space for the newly overheard block.

In some embodiments, stored portions of the least-recently-sent block in the cache may be evicted once the number of blocks stored in the cache reaches the predetermined threshold so that a corresponding randomly selected portion of the newly received block may be stored in the cache. As used herein, the phrase "least-recently-sent block" refers to the block of information in the cache that was least recently transmitted (or "sent") from the server to any of the caches that are able to overhear this transmission. In some embodiments, stored portions of the blocks may be selected for eviction using other rules including selecting least-frequently-sent portions, selecting a combination of least-recently-sent and least-frequently-sent blocks, or other rules for selecting blocks that are subject to cache eviction. In some embodiments, the server can instruct caches to evict specific blocks or portions thereof. Since each cache independently selects and caches a different random portion of the received blocks, the caches may include complementary portions of different programs. Thus, the content provider can transmit linear combinations of the complementary portions when the users associated with different caches request the different programs, thereby reducing the volume of data transmitted over the shared network connection.

Figure 1:
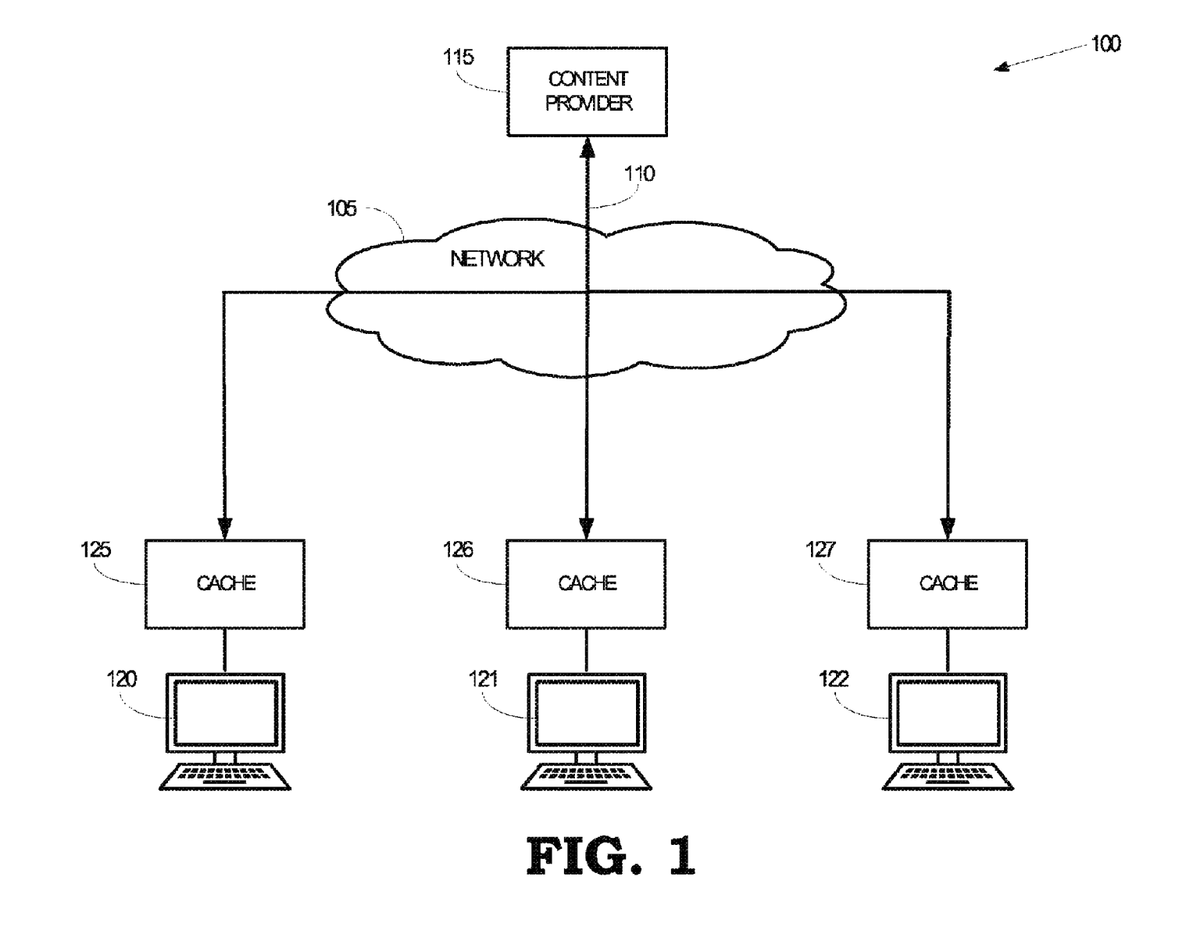
FIG. 1 is a diagram of a communication system according to some embodiments.

FIG. 1 is a diagram of a communication system 100 according to some embodiments. The communication system 100 includes a network 105 that supports a network connection 110 between a content provider 115 and a plurality of users 120, 121, 122 (collectively referred to as the "users 120-122"). The term "user" may refer to a device that transmits or receives information over the network connection 110, such as a desktop computer, laptop computer, tablet computer, a smart phone, or smart television, as well as the person that is using the device. Furthermore, each of the users 120-122 shown in FIG. 1 may represent a single user or a plurality of users. Embodiments of the network 105 or the network connection 110 may be implemented using wired connections, wireless connections, or any combination thereof.

The users 120-122 are associated with corresponding caches 125, 126, 127 (collectively referred to as "the caches 125-127") that are used to store information received from the content provider 115. Caching of the information received from the content provider may be performed before, after, or concurrently with providing this information to the users 120-122. Some embodiments of the caches 125-127 include cache entries or cache lines and each cache entry or line may store a segment of a block of digital content received from the content provider. For example, as discussed in detail herein, the caches 125-127 may be able to store segments of blocks of digital content selected from the blocks of digital content that are transmitted over the network connection 110.

Blocks, segments of blocks, or combinations of segments of blocks of digital content may be transmitted over the network connection 110 in response to requests for the blocks from one or more of the users 120-122. The caches 125-127 may select portions of the transmitted blocks based on criteria including fullness of the caches 125-127, a number of blocks cached in the caches 125-127, and ages of blocks that are cached in the caches 125-127. The cache selection process may therefore be referred to as a dynamic process or an "online" process because the caches 125-127 select portions of the blocks concurrently with provision of the digital content to the users 120-122. For example, the caches 125-127 may select and cache portions of blocks of digital content that represent a television show that is currently being watched by the user 122. The cache selection process may also be referred to as a "decentralized" process because the caches 125-127 may not communicate with each other and each cache 125-127 can independently select and cache portions of the blocks of digital content that are being conveyed over the network connection 110. Consequently, the information stored in the caches 125-127 may evolve and change as different programs are requested by the users 120-122. Furthermore, the caches 125-127 may store different and complementary portions of blocks of the programs that have been requested by the users 120-122, which may provide opportunities to reduce the volume of data transmitted over the network connection 110 by transmitting invertible combinations of the complementary blocks stored by the different caches 125-127, as discussed herein.

When one or more of the users 120-122 subsequently requests one of the blocks of digital content, the requested block may be reconstructed by combining the stored segments of the requested block with information transmitted by the content provider 115 that can be used to generate any un-cached segments of the requested block. For example, in response to the request, the content provider 115 may transmit an invertible combination of one or more segments that were previously cached in an associated cache 125-127 and one or more segments of the requested block that are not cached in the associated cache 125-127. The combination may then be inverted using the previously cached segments to recover the un-cached segments of the requested block. The recovered segments may be combined with the previously cached segments of the requested block to reconstruct the requested block. Some embodiments of the caches 125-127 include logic for reconstructing the requested blocks. However, in some embodiments, additional logic associated with the users 120-122 or the caches 125-127 may be used to reconstruct the requested blocks using cached information and information provided by the content provider 115. The complete requested block may then be provided to the requesting user(s) 120-122.

Some embodiments of the caches 125-127 may feedback information identifying the selected portions of the blocks transmitted over the network connection 110. For example, the cache 125 may randomly select a subset of the segments of a block for caching and may then feedback information identifying the segments in the selected subset. The identifying information may include a block identifier and a segment number. For another example, the cache 125 may randomly select a subset of the segments of a reconstructed block of information that was requested by another user, such as the user 121, and may then feedback the information identifying the segments of the selected subset of the reconstructed block. The content provider 115 may then store the feedback information so that the content provider 115 can determine which segments of which blocks are currently cached in each of the caches 125-127. Some embodiments of the content provider 115 may be able to determine which segments of which blocks are currently cached in each of the caches 125-427 without using feedback from the caches 125-427. For example, if the caches 125-127 use a pseudo-random selection process, the content provider 115 may be able to replicate this process and determine which segments of which blocks were selected by the caches 125-427.

Figure 2:
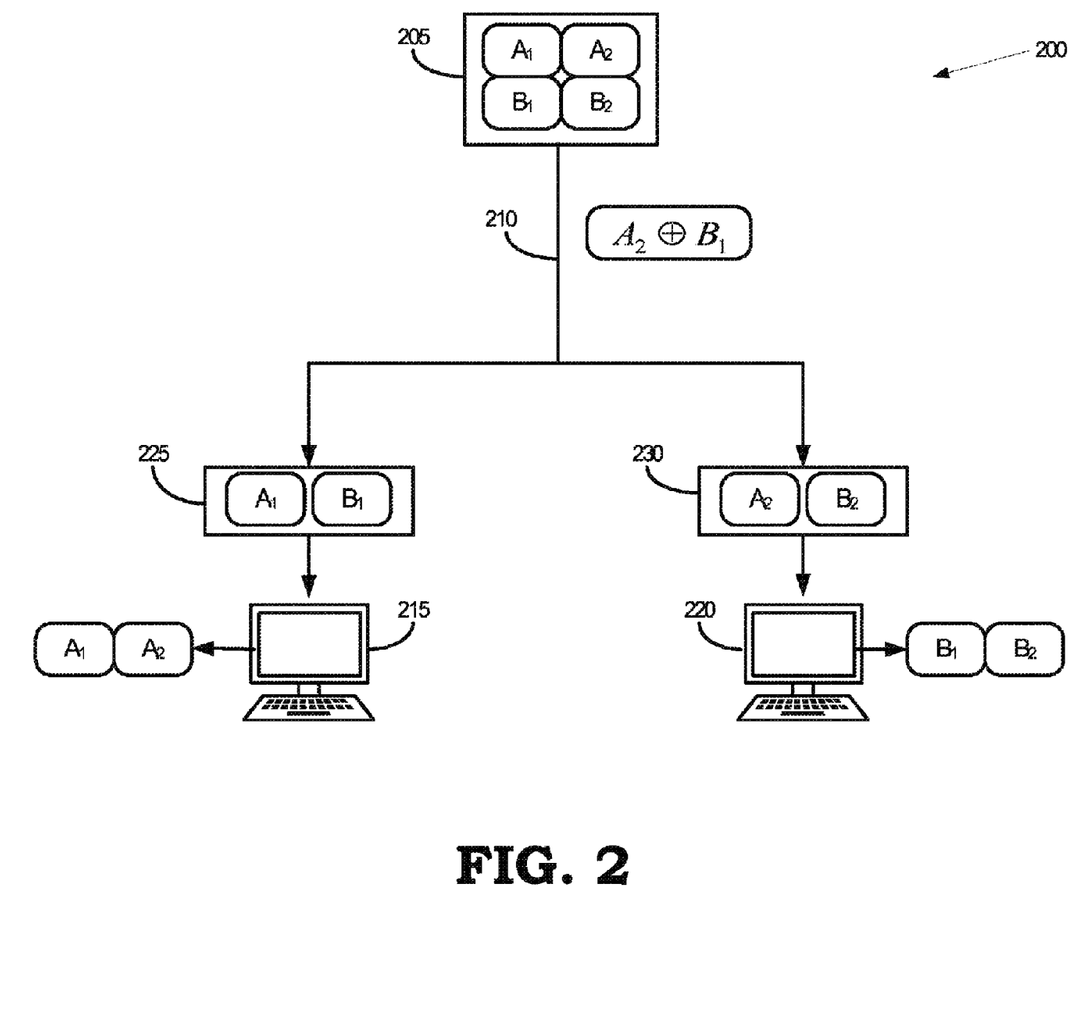
FIG. 2 is a block diagram of a communication network according to some embodiments.

FIG. 2 is a block diagram of a communication network 200 according to some embodiments. The communication network 200 includes a content provider 205 that stores or accesses digital content and provides information representing the digital content over a network connection 210. For example, the content provider 205 may store digital content for two programs (A and B) such as television programs, movies, and the like. The digital content representing each of the programs may be divided into segments, e.g., the segments $A_1$, $A_2$, and $B_2$. A plurality of users 215, 220 may request any of the programs stored by the content provider 205 for viewing. The users 215, 220 may also access portions of the programs from associated caches 225, 230 that may cache portions of the programs that are selected concurrently with the programs being provided to one or more the users 215, 220, as discussed herein. For example, the cache 225 may have selected and cached the segments $A_1$ and $B_1$ (or portions thereof) while the user 220 was viewing the programs A and B.

The content provider 205 may then provide invertible combinations of cached and un-cached portions to one or more of the users 215, 220 in response to the users 215, 220 requesting one or more of the programs A and B. As used herein, the term "invertible combination" means that a cache 225, 230 (or other logic) that receives the invertible combination can retrieve an un-cached portion of information by inverting the invertible combination using a portion of the information from the invertible combination that is cached in the cache 225, 230. For example, if the user 215 requests the program A or the user 220 requests program B (or both), the content provider 205 provides an invertible combination of $A_2$ and $B_1$. The invertible combination may include bits representing $A_2$ XOR $B_1$ and the bits that represent the invertible combination may be transmitted over the network connection 210 so that both users 215, 220 can receive the bits. The users 215, 220 may then invert, the combination to recover the un-cached portion of the requested program. For example, the user 215 may perform the operation ($A_2$ XOR $B_1$) XOR $B_1$ to invert the invertible combination and recover $A_2$ from the transmitted bits. The user 220 may perform the operation ($A_2$ XOR $B_1$) XOR $A_2$ to recover $B_1$ from the transmitted bits. The recovered bits and the previously cached bits can then be combined to reconstruct the programs A or B.

Figure 3:
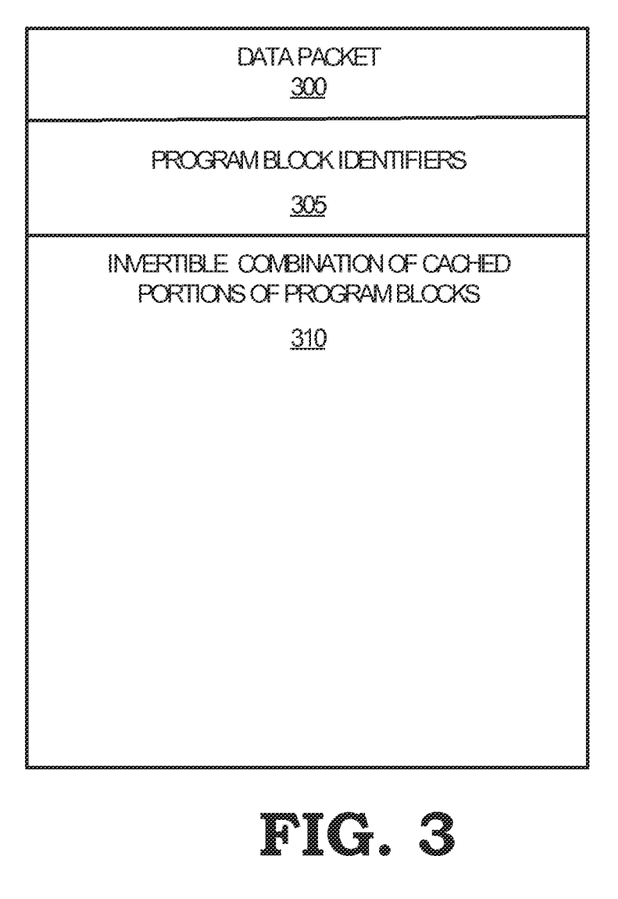
FIG. 3 illustrates an example of a data packet that can be used to transmit invertible combinations of portions of a block of digital content according to some embodiments.

FIG. 3 illustrates an example of a data packet 300 that can be used to transmit invertible combinations of portions of a block of digital content according to some embodiments. Some embodiments of the data packet 300 include information identifying the program blocks that contribute portions of the invertible combinations transmitted by the data packet 300. The identifying information may be transmitted in a header that includes program block identifiers 305 that identify the different program blocks represented in the invertible combinations. For example, a header including program block identifiers 305 may include information identifying programs A and B if the invertible combination includes portions from programs A and B such as $A_2$ and $B_1$. The data packet 300 may also include invertible combinations 310 of cached portions of program blocks. For example, the data packet 300 may include an invertible combination 310 such as $A_2$ XOR. $B_1$.

Figure 4:
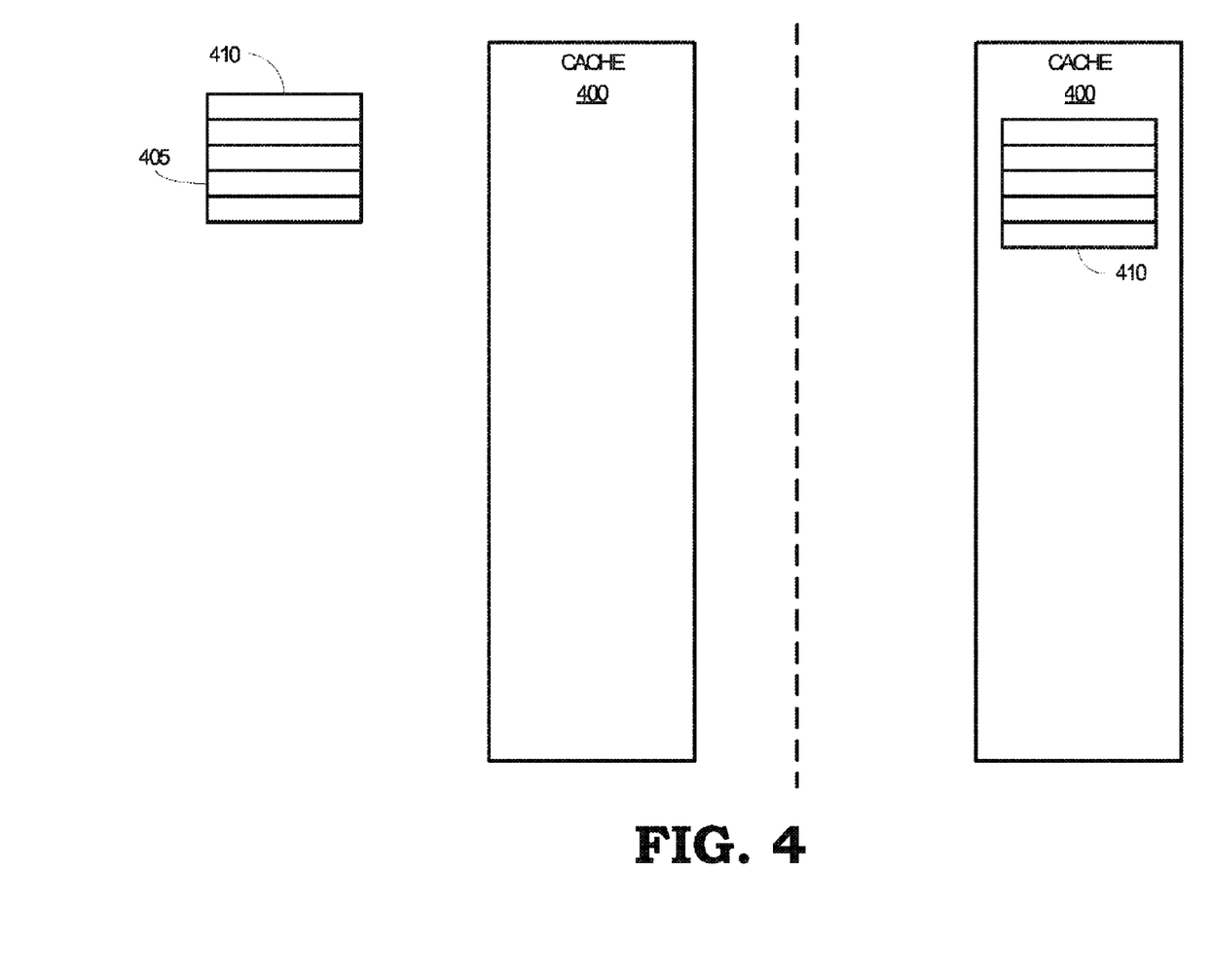
FIG. 4 is a block diagram of a cache before and after caching data according to some embodiments.

FIG. 4 is a block diagram of a cache 400 before and after caching data according to some embodiments. On the left-hand side of FIG. 4, the state of the cache 400 is shown prior to caching one or more segments 405 (only one indicated by a reference numeral in the interest of clarity) of a block 410 of digital content. On the right-hand side of FIG. 4, the state of the cache 400 is shown after caching one or more segments 405 of a block 410 of digital content. The cache 400 is empty prior to caching any data. The cache 400 may then detect the block 410, e.g., by monitoring a network connection to a content provider such as the content provider 115 shown in FIG. 1. Since the cache 400 is empty, the cache 400 may cache all of the segments 405 in the block 410, as shown on the right-hand side of FIG. 4. A timestamp may be associated with the block 410 to indicate when the block 410 was last sent to an end-user, which in this case is the time at which the block 410 was cached in the cache 400. A frequency stamp may be associated with the block 410 to indicate how frequently the block 410 has been sent to an end-user. This process may be referred to as an "Add" procedure because substantially all of the segments 405 in the block 410 are added to the cache 400.

Figure 5:
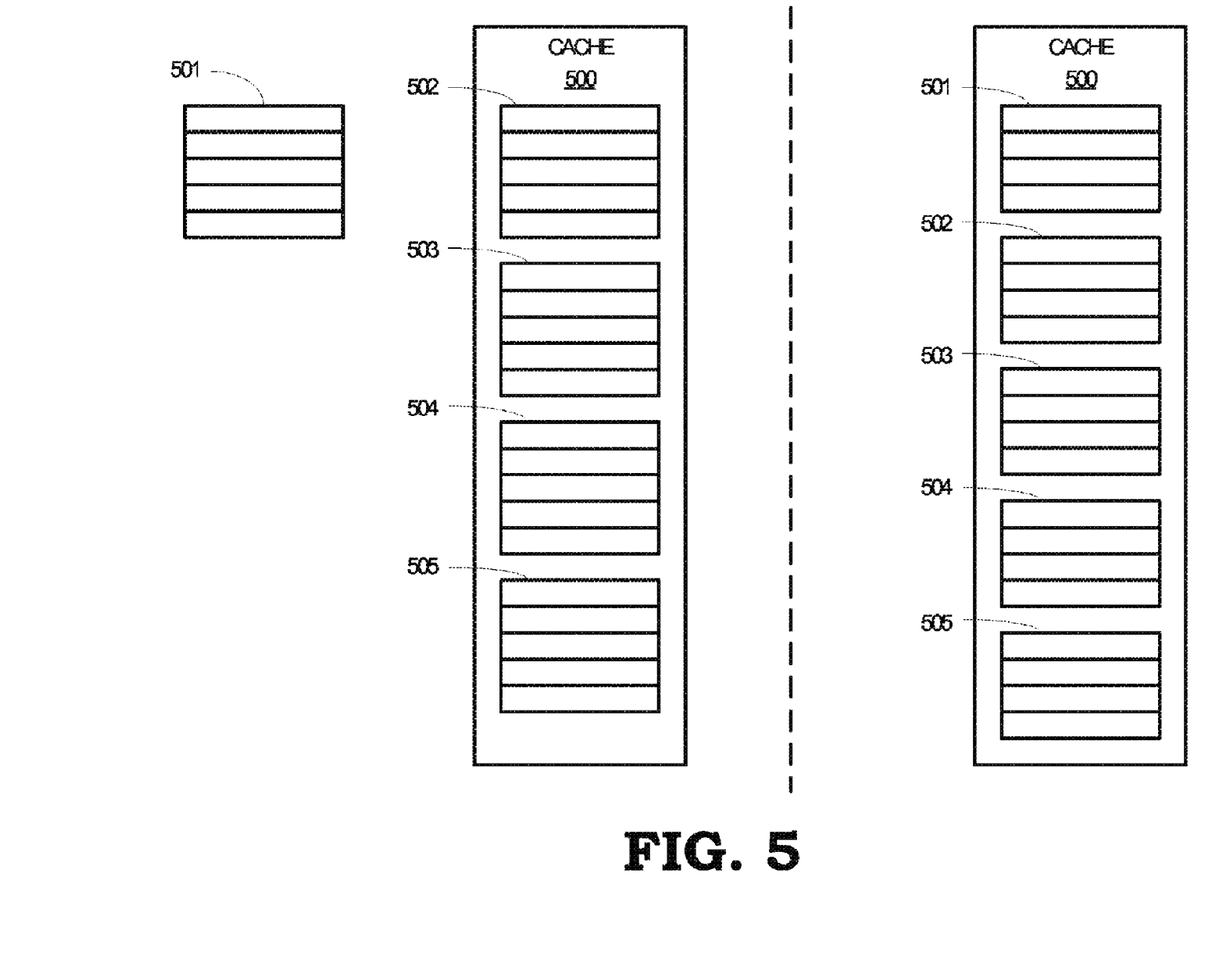
FIG. 5 is a block diagram of a cache before and after caching data according to some embodiments.

FIG. 5 is a block diagram of a cache 500 before and after caching data according to some embodiments. The left-hand side of FIG. 5 shows the state of the cache 500 prior to the caching operation and the right-hand side of FIG. 5 shows the state of the cache 500 after the caching operation. Initially, the cache 500 detects a block 501, e.g., by monitoring a network connection to a content provider such as the content provider 115 shown in FIG. 1. The cache 500 has already cached segments of the blocks 502, 503, 504, 505 (referred to herein as "the blocks 502-505") and the cache 500 is substantially full. As used herein, the term "substantially full" indicates that enough of the memory space of the cache 500 has been used to store the blocks 502-505 so that there is insufficient room to store portions of the block 501, e.g., the cache 500 does not have space to cache a segment of the cache 500. The cache 500 may therefore be unable to perform an "Add" procedure such as the procedure described with reference to FIG. 4.

The cache 500 may instead perform a "Shrink-and-Add" procedure that evicts portions of the blocks 502-505 to make room to store a portion of the block 501. Some embodiments of the cache 500 may perform the "Shrink-and-Add" procedure in response to the cache 500 being full and including a number of blocks 502-505 that is less than a predetermined threshold number. To "shrink" the previously cached blocks 502-505, some embodiments of the cache 500 randomly select a subset of the segments of the blocks 502-505 for eviction from the cache 500. For example, since the capacity of the cache 500 corresponds to four entire blocks 502-505, the cache 500 may randomly select approximately 20% of the lines in each of the blocks 502-505 for eviction. Once the randomly selected lines have been evicted from the cache 500, the cache 500 may randomly select a corresponding portion of the block 501 to be cached in the cache 500. For example, the cache 500 may select and store approximately 80% of the lines in the block 501. Some embodiments of the cache 500 may select the subsets of the segments of the blocks 502-505 so that each of the subsets has approximately the same number of segments.

A timestamp may be associated with the block 501 to indicate when the block 501 was last sent to an end-user, which in this case corresponds to the time at which the block 501 was cached in the cache 500. The timestamp associated with the blocks 501-505 may therefore be used to indicate the relative order in which the blocks 501-505 have been sent to end-users. The least-recently-sent block may be identified using the timestamp. Some embodiments of the cache 500 may also indicate the order in which the blocks 501-505 have been sent to end-users based on their ordering or position within the cache 500. For example, the bottom block 505 in cache 500 may be the least-recently-sent block in the cache 500. In some embodiments, a frequency stamp may be associated with the block 501 to indicate how frequently the block 501 has been sent to end-users. The least-frequently-sent block may therefore be identified using the frequency stamp.

Figure 6:
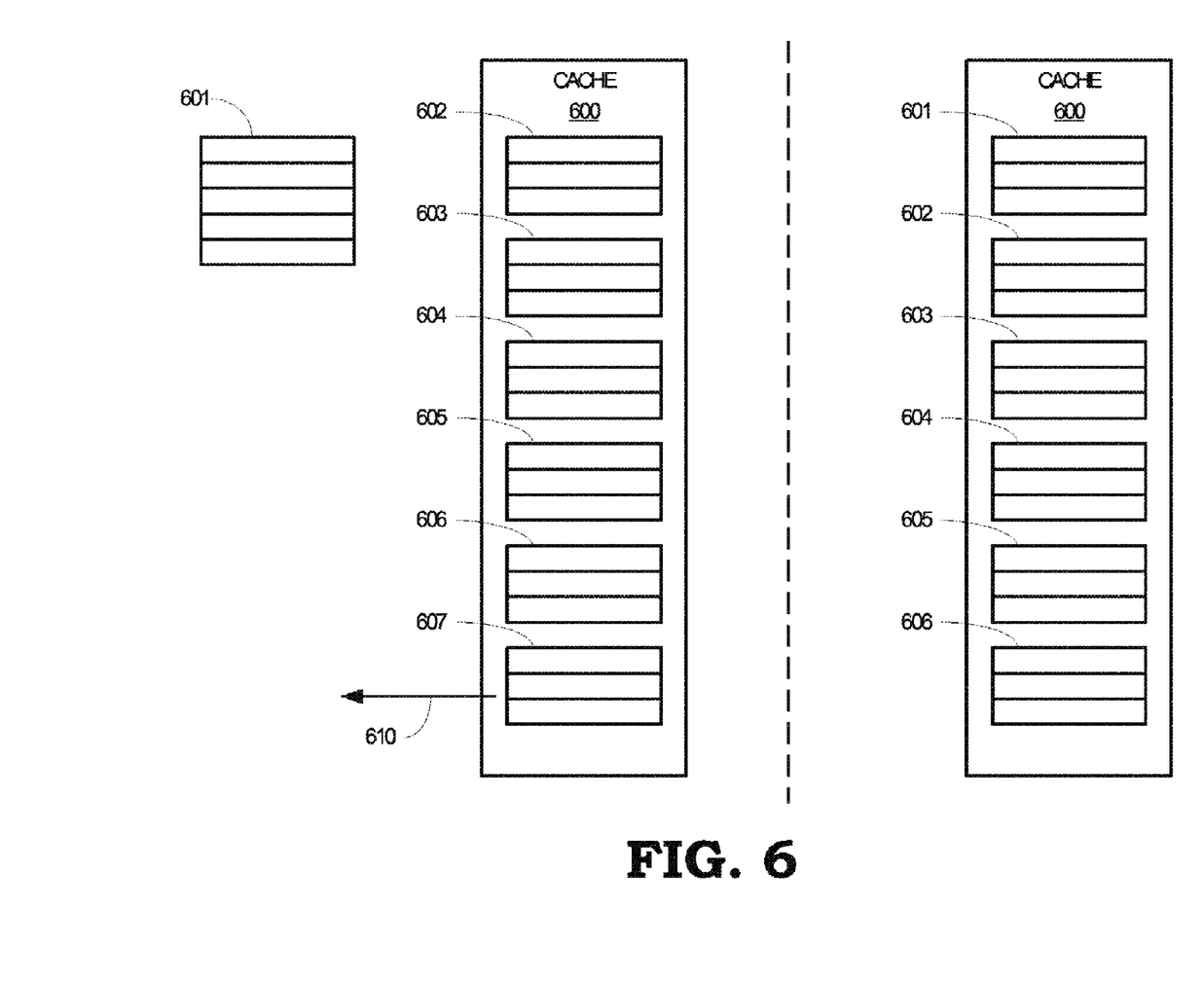
FIG. 6 is a block diagram of a cache before and after caching data according to some embodiments.

FIG. 6 is a block diagram of a cache 600 before and after caching data according to some embodiments. The left-hand side of FIG. 6 shows the state of the cache 600 prior to the caching operation and the right-hand side of FIG. 6 shows the state of the cache 600 after the caching operation. Initially, the cache 600 detects a block 601, e.g., by monitoring a network connection to a content provider such as the content provider 115 shown in FIG. 1. The cache 600 has already cached segments of the blocks 602, 603, 604, 605, 606, 607 (referred to herein as "the blocks 602-607") and the cache 600 is substantially full so the cache 600 is unable to perform the "Add" operation to add the entire block 601. Furthermore, the number of blocks 602-607 is equal to a predetermined threshold number of blocks. Performing the "Shrink-and-Add" operation would cause the number of blocks in the cache 600 to exceed the predetermined threshold number and so the cache 600 is unable to perform the "Shrink-and-Add" operation.

The cache 600 may therefore perform a "Remove-and-Add" operation that evicts a block from the cache 600 and adds a selected subset of the block 601 to the cache 600. The evicted block may be selected for eviction based upon a cache eviction rule and the subset of the block 601 may be selected randomly. Some embodiments may choose the least-recently-sent block to evict from the cache 600. For example, the block 607 may be the least-recently-sent block, as indicated by its associated timestamp or position within the cache 600. The block 607 may therefore be evicted from the cache 600 as indicated by the arrow 610. The selected subset of the block 601 may then be cached in the cache 600 and a new timestamp may be associated with the block 601, which indicates that the block 601 is the most-recently-used of the blocks 601-606 that are currently cached in the cache 600. The block 606 then becomes the least-recently-sent one of the blocks 601-606 that are currently cached in the cache 600. The timestamps associated with the blocks 601-606 may also be updated in response to other operations such as hits or misses to segments of the blocks 601-606. Some embodiments may choose the least-frequently-sent block to evict from the cache 600. For example, the block 607 may be the least-frequently-sent block, as indicated by its associated frequency stamp. Some embodiments may use both the timestamp and the frequency stamp to decide which block to evict from the cache 600.

In operation, a cache (such as the caches 400, 500, 600) that is associated with the user may exhibit a three-phase behavior. Initially, the cache is empty. In the first phase, the cache may be filled by adding entire blocks of digital content that are observed on a network connection between the cache and a content provider. The first phase may continue until the cache is full. In the second phase, when the cache observes new blocks of digital content on the network connection, the cache may reduce the sizes of the currently cached blocks and then cache a subset of the new block. The second phase may continue until a predetermined threshold number of blocks has been cached in the cache. In the third phase, the number of blocks in the cache is greater than or equal to the predetermined threshold number of blocks. The number of blocks in the cache is therefore maintained at the predetermined number of blocks by evicting a block, such as the least-recently-sent block, before adding a selected subset of the new block.

Figure 7:
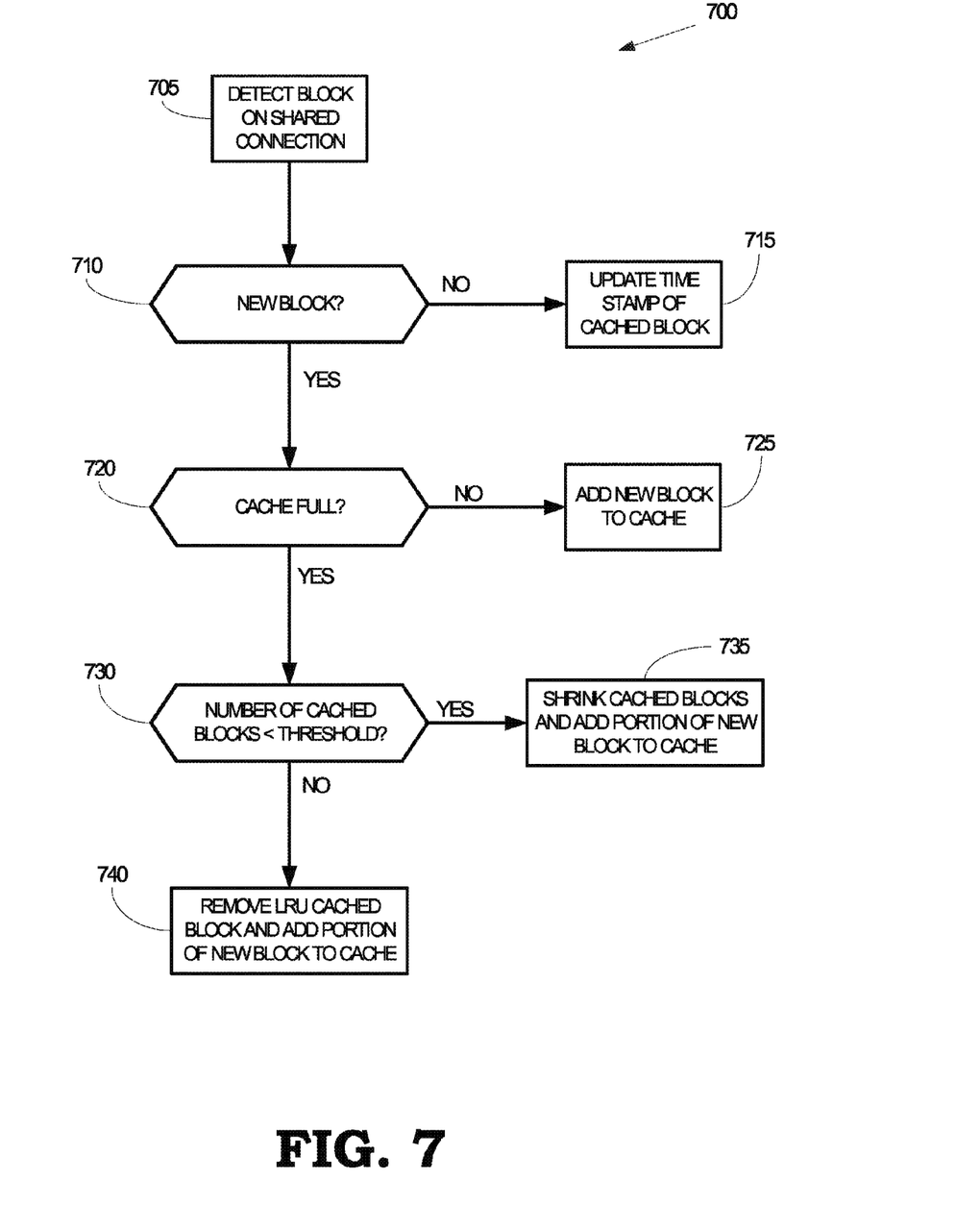
FIG. 7 is a flow diagram of a method for caching portions of blocks of data according to some embodiments.

FIG. 7 is a flow diagram of a method 700 for caching portions of blocks of data according to some embodiments. Embodiments of the method 700 may be implemented in a cache such as the caches 125-127 shown in FIG. 1, which may be associated with one or more users such as the users 120-122 shown in FIG. 1. At block 705, the cache detects a block being transmitted on a network connection that is shared with one or more other caches or users. The block may be transmitted in response to a request by one or more of the users to receive the digital content included in the block. At decision block 710, the cache determines whether the block is "new," e.g. the block includes one or more segments of digital content from a block that has not been cached in the cache. A block of digital content is considered to be "cached" if any portion or segment of the block is cached in the cache. If not, and a portion of the block is already cached in the cache, a timestamp and/or a frequency stamp associated with the cached block may be updated at block 715. If the block is a new block, the cache determines whether the cache is full at decision block 720.

The new block of data may be added to the cache at block 725 as long as the cache is not yet full. Once the cache becomes full, the flow of the method 700 proceeds to decision block 730 where the cache determines whether the number of cached blocks in the cache is less than a predetermined threshold. If so, the previously cached blocks may be "shrunk" by evicting a portion of the segments of each of the previously cached blocks at block 735 based upon a cache eviction rule. A corresponding portion of the new block may then be added to the cache. If not, and the number of cached blocks is greater than or equal to the threshold, one of the previously cached blocks is evicted and a portion of the new block is cached in the cache at block 740. For example, the cache eviction rule may indicate that a least-recently-sent one of the previously cached blocks may be evicted and replaced with a correspondingly sized portion of the new block.

Figure 8:
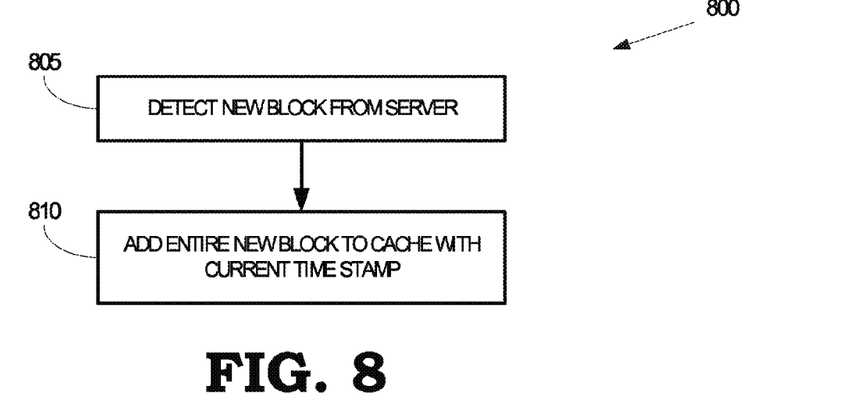
FIG. 8 is a flow diagram of a method for adding blocks to a cache according to some embodiments.

FIG. 8 is a flow diagram of a method 800 for adding blocks to a cache according to some embodiments. Embodiments of the method 800 may be implemented in a cache such as the caches 125-127 shown in FIG. 1. At block 805, the cache detects a new block that is transmitted over a network connection shared between the cache and one or more other caches. As used herein, the term "new block" refers to a block that has not been previously cached in any of the caches that share the network connection. New blocks may be sent over the network connection in an uncoded format, e.g., the information in the block may not be transmitted as part of a linear combination with information from another block. Some embodiments of the cache may detect the new block using a header in a data packet such as the header including program block identifiers 305 in the data packet 300 shown in FIG. 3. At block 810, the entire new block may be added to the cache. A timestamp and/or a frequency stamp may also be associated with the new block to indicate when the new block was sent to an end-user and/or how frequently the new block has been sent to an end-user. In some embodiments, the received information may be associated with multiple blocks and so the method 800 may be applied to all the new blocks indicated in the received information.

Figure 9:
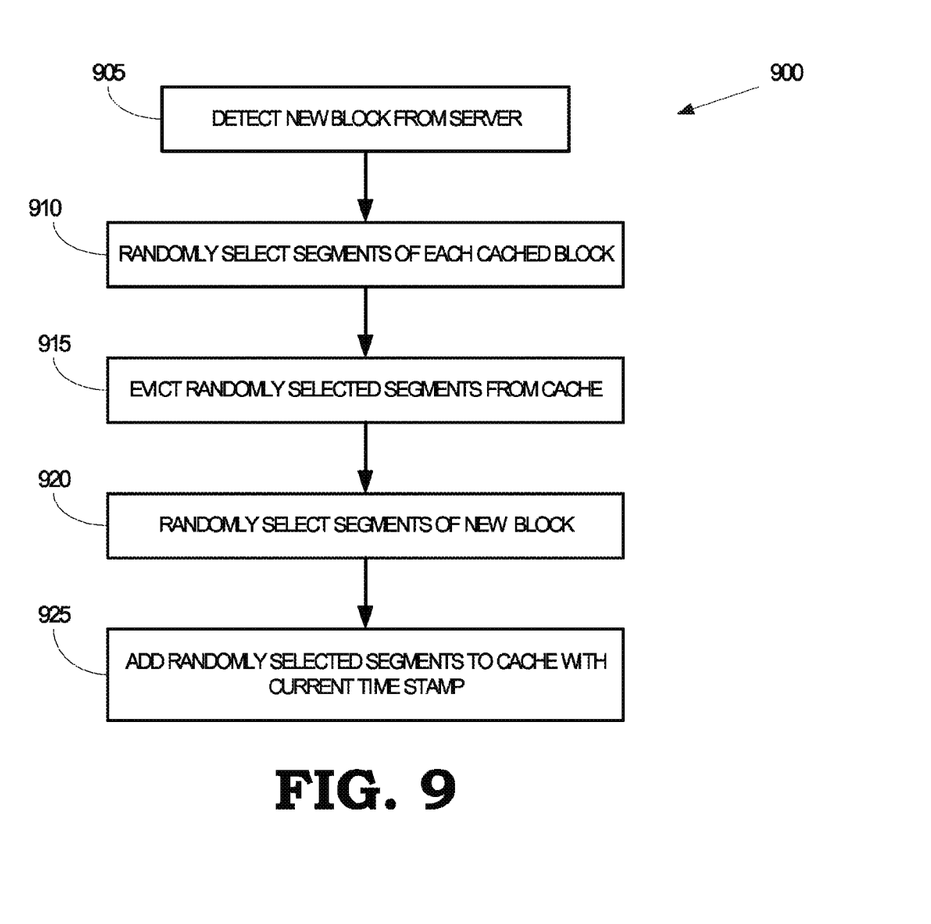
FIG. 9 is a flow diagram of a me method for reducing the size of previously cached blocks in a cache and adding a selected portion of a new block to the cache according to some embodiments.

FIG. 9 is a flow diagram of a method 900 for reducing the size of previously cached blocks in a cache and adding a selected portion of a new block to the cache according to some embodiments. Embodiments of the method 900 may be implemented in a cache such as the caches 125-127 shown in FIG. 1. At block 905, the cache detects a new block that is transmitted over a network connection shared between the cache and one or more other caches. Some embodiments of the cache may detect the new block using a header in a data packet such as the header including program block identifiers 305 in the data packet 300 shown in FIG. 3.

At block 910, the cache may shrink the size of the previously cached blocks by randomly selecting segments of each cached block for eviction from the cache based on a cache eviction rule. At block 915, the cache evicts the randomly selected segments from the cache.

At block 920, the cache randomly selects segments of the new block. Some embodiments of the cache may randomly select a number of segments of the new block that is equal to the total number of segments that were selected from the previously cached blocks and evicted from the cache. The number of segments of the new block and the total number of evicted segments may be selected so that the number of cached segments of the new block is equal to the number of segments in each of the previously cached blocks after eviction of the selected segments. At block 925, the randomly selected segments of the new block may be cached in the cache. Some embodiments may associate a timestamp with the new block to indicate when the new block was sent to an end-user or a frequency stamp to indicate how frequently the new block has been sent to an end-user. In some embodiments, the received information may be associated with multiple blocks and so the method 900 may be applied to all the new blocks indicated in the received information.

Figure 10:
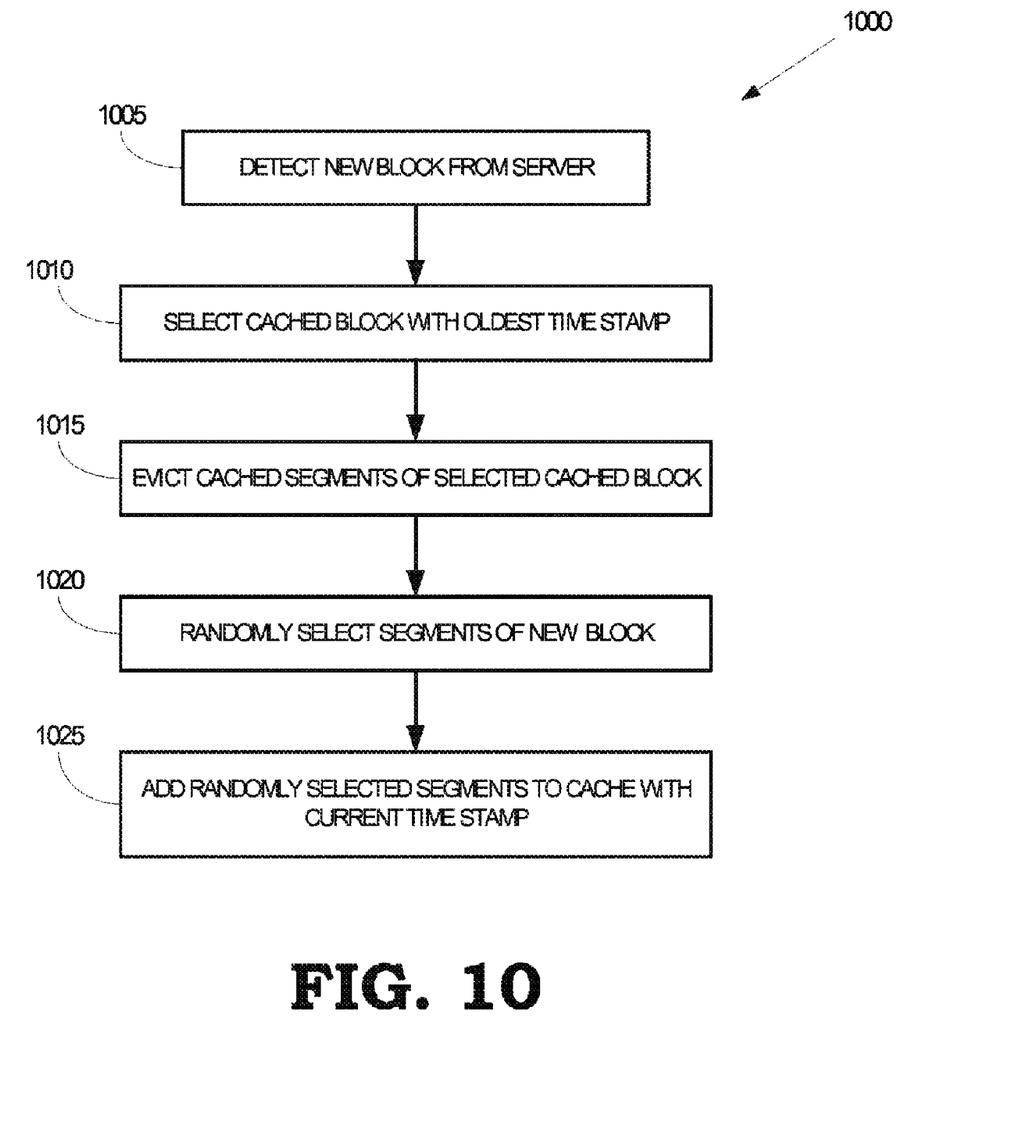
FIG. 10 is a flow diagram of a method for evicting previously cached blocks from a cache and then adding a selected portion of a new block to the cache according to some embodiments.

FIG. 10 is a flow diagram of a method 1000 for evicting previously cached blocks from a cache and then adding a selected portion of a new block to the cache according to some embodiments. Embodiments of the method 1000 may be implemented in a cache such as the caches 125-127 shown in FIG. 1. At block 1005, the cache detects a new block that is transmitted over a network connection shared between the cache and one or more other caches. Some embodiments of the cache may detect the new block using a header in a data packet such as the header including program block identifiers 305 in the data packet 300 shown in FIG. 3.

At block 1010, a cache selects a block for eviction from the cache based on a cache eviction rule. For example, the cache may select the block with the oldest timestamp, e.g., the least-recently-sent block in the cache for eviction. For another example, the cache may select the block with the smallest frequency stamp, e.g., the least-frequently-sent block in the cache, for eviction. At block 1015, the cached segments of the selected cached file may then be evicted from the cache.

At block 1020, the cache randomly selects segments of the new block. Some embodiments of the cache may randomly select a number of segments of the new block that is equal to the number of segments of the evicted block that were cached in the cache. The number of cached segments of the new block may therefore be equal to the number of segments in each of the previously cached blocks after eviction of the cached segments of the evicted block. At block 1025, the randomly selected segments of the new block may be cached in the cache. Some embodiments may associate a timestamp with the new block to indicate when the new block was sent to an end-user and/or a frequency stamp to indicate how frequently the new block has been sent to an end-user. In some embodiments, the received information may be associated with multiple blocks and so the method 1000 may be applied to all the new blocks indicated in the received information.

In some embodiments, certain aspects of the techniques described above may implemented by one or more processors of a processing system executing software. The software comprises one or more sets of executable instructions stored or otherwise tangibly embodied on anon-transitory computer readable storage medium. The software can include the instructions and certain data that, when executed by the one or more processors, manipulate the one or more processors to perform one or more aspects of the techniques described above. The non-transitory computer readable storage medium can include, but is not limited to, optical media (e.g., compact disc (CD), digital versatile disc Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)). The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    caching, at a first cache associated with a first user and in response to at least one of the first user and at least one second user requesting a first block, a first portion of the first block of digital content received over a network connection shared with said at least one second user, wherein the first cache selects the first portion based on at least one of a fullness of the first cache, a number of blocks cached in the first cache, and a cache eviction rule associated with the first cache, wherein said at least one second user is associated with at least one second cache;

receiving an invertible combination of a second portion of the first block and a first portion of a second block that is cached in the first cache, wherein the second portion of the first block is not cached in the first cache, and wherein the first portion of the second block is not cached in said at least one second cache; and reconstructing, in response to the first user requesting the first block, the second portion of the first block by inverting the invertible combination using the first portion of the first block in the first cache.

2. The method of claim 1, further comprising:
updating at least one of a timestamp and a frequency stamp associated with the first block in response to receiving the first block over the network connection after caching the first portion of the first block.

3. A method comprising:
caching, at a first cache associated with a first user and in response to at least one of the first user and at least one second user requesting a first block, a first portion of the first block of digital content received over a network connection shared with said at least one second user, wherein the first cache selects the first portion based on at least one of a fullness of the first cache, a number of blocks cached in the first cache, and a cache eviction rule associated with the first cache, wherein caching the first portion of the first block comprises caching substantially all of the first block in response to the fullness indicating that the first cache is not full, and wherein caching the first portion of the first block comprises, in response to the fullness indicating that the first cache is full and the number of blocks cached in the first cache being less than a threshold, evicting randomly selected portions of previously cached blocks and caching a randomly selected portion of the first block.

4. The method of claim 3, wherein caching the first portion of the first block comprises, in response to the fullness indicating that the first cache is full and the number of blocks cached in the first cache being greater than or equal to the threshold, evicting at least one of a least-recently-sent block and a least-frequently-sent from the first cache and caching a randomly selected portion of the first block.

5. An apparatus comprising:
a first cache to cache a first portion of a first block of digital content received over a network connection shared between a first user associated with the first cache and at least one second user, where in the first cache caches the first portion in response to at least one of the first user and said at least one second user requesting the first block, wherein the first cache selects the first portion based on at least one of a fullness of the first cache, a number of blocks cached in the first cache, and a cache eviction rule associated with the first cache; and at least one second cache associated with said at least one second user, the first cache is to receive an invertible combination of a second portion of the first block and a first portion of a second block that is cached in the first cache, wherein the second portion of the first block is not cached in the first cache, and wherein the first portion of the second block is not cached in said at least one second cache, and wherein the first cache is to reconstruct, in response to the first user requesting the first block, the second portion of the first block by inverting the invertible combination using the first portion of the first block in the first cache.

6. The apparatus of claim 5, wherein the first cache is to update at least one of a timestamp and a frequency stamp associated with the first block in response to receiving the first block over the network connection after caching the first portion of the first block.

7. An apparatus comprising:
a first cache to cache a first portion of a first block of digital content received over a network connection shared between a first user associated with the first cache and at least one second user, where in the first cache caches the first portion in response to at least one of the first user and said at least one second user requesting the first block, wherein the first cache selects the first portion based on at least one of a fullness of the first cache, a number of blocks cached in the first cache, and a cache eviction rule associated with the first cache, wherein the first cache is to cache substantially all of the first block in response to the fullness indicating that the first cache is not full, and wherein the cache eviction rule indicates that the first cache is to evict randomly selected portions of previously cached blocks in response to the fullness indicating that the first cache is full and the number of blocks cached in the first cache being less than a threshold, and wherein the first cache is to cache a randomly selected portion of the first block in response to evicting the randomly selected portions of previously cached blocks.

8. The apparatus of claim 7, wherein the cache eviction rule indicates that the first cache is to evict at least one of a least-recently-sent block and a least-frequently-sent block from the first cache in response to the fullness indicating that the first cache is full and the number of blocks cached in the first cache being greater than or equal to the threshold, and wherein the first cache is to cache a randomly selected portion of the first block in response to evicting said at least one of the least-recently-sent block and the least-frequently-sent block.

9. A non-transitory computer readable storage medium embodying a set of executable instructions, the set of executable instructions to manipulate at least one processor to:
cache, at a first cache associated with a first user and in response to at least one of the first user and at least one second user requesting a first block, a first portion of the first block of digital content received over a network connection shared with said at least one second user, wherein the first cache selects the first portion based on at least one of a fullness of the first cache, a number of blocks cached in the first cache, and a cache eviction rule associated with the first cache, and receive an invertible combination of a second portion of the first block and a first portion of a second block that is cached in the first cache, wherein the second portion of the first block is not cached in the first cache, and wherein the first portion of the second block is not cached in at least one second cache associated with said at least one second user; and reconstruct, in response to the first user requesting the first block, the second portion of the first block by inverting the invertible combination using the first portion of the first block in the first cache.

10. The non-transitory computer readable storage medium of claim 9, further embodying a set of executable instructions to manipulate said at least one processor to:
update at least one of a timestamp and a frequency stamp associated with the first block in response to receiving the first block over the network connection after caching the first portion of the first block.

11. A non-transitory computer readable storage medium embodying a set of executable instructions, the set of executable instructions to manipulate at least one processor to:
cache, at a first cache associated with a first user and in response to at least one of the first user and at least one second user requesting a first block, a first portion of the first block of digital content received over a network connection shared with said at least one second user, wherein the first cache selects the first portion based on at least one of a fullness of the first cache, a number of blocks cached in the first cache, and a cache eviction rule associated with the first cache;
cache substantially all of the first block in response to the fullness indicating that the first cache is not full;
evict randomly selected portions of previously cached blocks and cache a randomly selected portion of the first block in response to the fullness indicating that the first cache is full and the number of blocks cached in the first cache being less than a threshold; and
evict at least one of a least-recently-sent block and a least-frequently-sent from the first cache and cache a randomly selected portion of the first block in response to the fullness indicating that the first cache is full and the number of blocks cached in the first cache being greater than or equal to the threshold.

12. A method comprising:
receiving, from a first cache associated with a first user, information identifying a first portion of a first block of digital content and a first portion of a second block of digital content selected for caching by the first cache after being received over a network connection shared with at least one second user;
receiving, from a second cache associated with the second user, information identifying a second portion of the first block and a second portion of the second block selected for caching by the second cache after being received over the network connection; and
transmitting an invertible combination of the second portion of the first block and the first portion of the second block over the network connection in response to at least one of a request from the first user for the first block and a request from the second user for the second block.

13. The method of claim 12, wherein transmitting the invertible combination comprises transmitting an exclusive-OR combination of the second portion of the first block and the first portion of the second block.

14. An apparatus comprising:
a server to:
receive, from a first cache associated with a first user, information identifying a first portion of a first block of digital content and a first portion of a second block of digital content selected for caching by the first cache after being received over a network connection shared with at least one second user;
receive, from a second cache associated with the second user, information identifying a second portion of the first block and a second portion of the second block selected for caching by the second cache after being received over the network connection; and
transmit an invertible combination of the second portion of the first block and the first portion of the second block over the network connection in response to at least one of a request from the first user for the first block and a request from the second user for the second block.

15. The apparatus of claim 14, wherein the server is to transmit an exclusive-OR combination of the second portion of the first block and the first portion of the second block.

* * * * *